Aug. 6, 1935.    F. E. RICE    2,010,109
SEAL
Filed Aug. 17, 1933
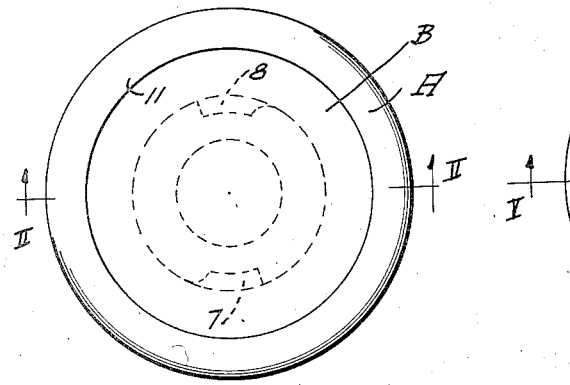
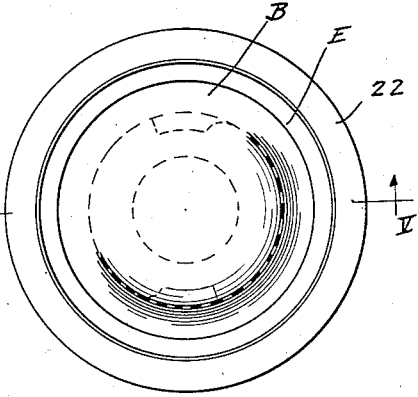
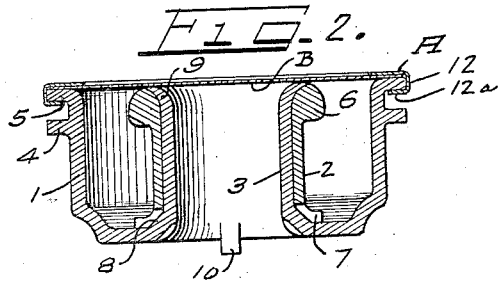
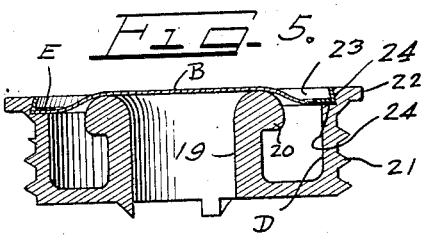
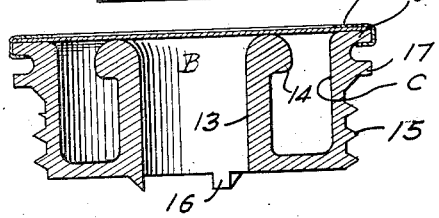
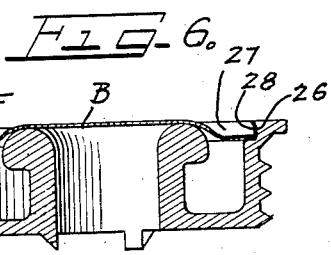
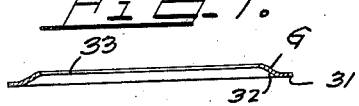
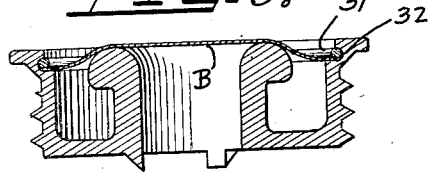
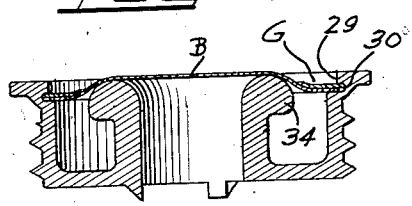
Inventor
FRANK E. RICE.
by Charles Hill
Attys.

UNITED STATES PATENT OFFICE 2,010,109

SEAL

Frank E. Rice, Detroit, Mich., assignor to American Tap Bush Company, Detroit, Mich., a corporation of Michigan Application August 17, 1933, Serial No. 685,551

1 Claim. (Cl. 217—114)

The present invention relates to a seal, and is concerned more particularly with a seal for tap bushes of beer barrels and the like, together with a method of sealing the tap bushes of such and similar barrels.

In connection with the sale of taxable liquors, it is required that the tap bushes or the tap openings through which the liquors may be removed from the containers be sealed as, for instance, by revenue stamps.

It has happened that in some instances the revenue stamps have been so applied as to be removable by unauthorized persons without damaging the stamps, and the stamps so removed have been applied to bootleg liquors, which liquors are then sold as liquors on which the revenue taxes have been paid.

It is an object of the present invention to provide a method of sealing tap bushes of beer barrels and the like, whereby the seal, such as a revenue stamp, may be removed for gaining access to the interior of the barrel or container, and at the same time the means employed for applying the stamp remain in place. Any sealing means which is found removed from containers returned to the breweries results in investigations as to why such sealing means have been removed, thereby enabling the authorities to run down unauthorized sale of bootleg liquors.

Another object of the invention is to provide means for adequately sealing tap bushes of beer barrels and the like.

Another object of the invention is to provide means for sealing tap bushes of beer barrels, and the like, in such manner that the seals may be removed for access to the barrels, and at the same time the sealing means remain in place.

A further object of the invention is to provide means for applying revenue stamps over tap bushes of beer barrels in such manner as to readily indicate whether or not the stamps have been fraudulently removed.

A still further object of the invention is to improve generally means for sealing tap bushes of beer barrels and the like.

The above, other and further objects of the invention will be apparent from the following description, accompanying drawing, and appended claim.

Various aspects of the present invention are illustrated in the accompanying drawing, and the views thereof are as follows:

Figure 1 is a plan view of a tap bush sealed in accordance with the principles of the present invention.

Figure 2 is a vertical sectional view taken substantially in the plane indicated by the line II—II of Figure 1.

Figure 3 is a sectional view, similar to Figure 2, showing a cast tap bush sealed in accordance with the principles of the present invention.

Figure 4 is a plan view of a tap bush sealed in accordance with the principles of the present invention, and showing a modification of the same.

Figure 5 is a vertical sectional view taken substantially in the plane indicated by the line V—V of Figure 4.

Figure 6 is a vertical sectional view, similar to Figure 5, showing a modification.

Figure 7 is a vertical sectional view through a sealing ring as utilized in the form of the invention illustrated in Figure 8.

Figure 8 is a vertical sectional view through a tap bush with a seal applied, and utilizing the ring of Figure 7 for sealing the bush.

Figure 9 is a vertical sectional view through a tap bush showing another form of sealing the revenue stamp or seal in a tap bush.

The drawing will now be explained.

The present invention contemplates the application of a seal, such as a revenue stamp, over a tap bush to cover the rod receiving opening of the same, and to affix the seal in position so that a portion of the seal may be removed for connecting a tap to the bush, and at the same time the means employed for affixing the seal remain in place in such manner as not to interfere with the application and use of a tap.

The tap bush illustrated in Figure 2 is a two-part bush and comprises a body member 1 and a neck 2. This body may be made as a forging or a stamping and as so made includes a central collar 3 which provides a recess for receiving a sealing cork and is adapted to receive the pump rod when a tap is applied to the bush. The body 1 is fashioned with two flanges 4 and 5, the flange 5 being the uppermost flange and is utilized for providing a rim about which the sealing ring A may be crimped to apply the seal or revenue stamp B in sealing relation with respect to the bush. The other flange 4 is disposed below the upper flange 5, and is utilized for the purpose of welding the bush to a steel barrel. The neck 2 may be made as a casting or forging, and as so made is provided with an upper flange 6 which is recessed at two opposite points, as at 7 and 8, to receive lugs on a tap for connecting a tap to the bush in gas-tight relation.

The neck 2 is provided with cut-out portions 7 to receive indentations 8 in the body 1, which are formed by any suitable tool to lock the neck against rotation with respect to the collar 3. After the neck has been applied about the collar, the upper extremity of the collar is flared as at 9 to secure the neck in position. In the formation of the body 1, lugs 10 may be struck out to provide projections for engagement by a cork to prevent accidental displacement of the cork from within the collar 3.

The sealing ring A consists of a ring made of inexpensive material, such for instance as tin, and is made as a ring, with a horizontal portion 11 and a flange portion 12. The flange portion 12, when the ring is made for application to a tap bush, extends from the horizontal portion 11 at an angle, preferably at an obtuse angle, so as to be readily applied over the flange 5 of the bush.

In sealing a tap bush with the ring A, the seal, such as the revenue stamp B, is placed over the tap bush with its margins engaging against the upper surface of the flange 5, thereupon the ring A is applied with its horizontal portion bearing against the marginal portions of the seal B and the flange 12 is then subjected to such action as to inturn a portion thereof, indicated at 12a so as to underlie the flange 5 and thus secure the revenue stamp or seal B to the bush. The seal A is herein described as being crimped or clamped to the bush which crimping or clamping may be accomplished by any suitable tool or means.

The bush illustrated in Figure 3 is adaptable for application to a wooden barrel and is there illustrated as being made as a casting. The bush C is provided with a central collar 13, which terminates in a flange 14 for co-operating with a tap to secure the tap to the bush in gas tight relation. The exterior of the body of the bush C is threaded as at 14 for engagement with a tap bush opening in the barrel. In this form of bush, projections 16 are cast integrally therewith, adjacent the lower extremity of the collar 13, for engagement by a cork to prevent accidental displacement of the cork due to gas pressure within the barrel.

In this form of bush, there is provided a flange 17 which may be utilized as a shoulder to limit the inward movement of the bush when applied to a barrel. Another flange 18 is provided, disposed above the flange 17, to receive the sealing ring A for applying the seal or revenue stamp B to the bush. The manner of applying the sealing ring A, as well as the construction of the ring, is the same as that described with reference to Figures 1 and 2.

Figure 5 illustrates a cast bush D having the collar 19, terminating in the flange 20, to cooperate with the tap. The exterior of the bush D is threaded as at 21 to engage an opening in a wooden barrel. A flange 22 is formed on the bush to limit inward movement of the bush when applied to a barrel. Inwardly of the margin of the flange 22, the upper portion of the bush is undercut to provide an undercut recess 23. The recess, in Figure 5, is illustrated as having an acute angular side 24 which is convergent outwardly of the bush. The horizontal shoulder 25 of the undercut recess 23, is disposed below the upper extremity of the flange 29 of the collar 19. In this form of bush, the seal or revenue stamp D is applied against the flange 20 of the collar and the margins of the stamp rest against the flat shoulder 25 of the undercut recess 23. A sealing or retaining ring E, which is acute angled in cross section, is then forced into the recess 23 against the margins of the seal B, and because of the inherent ring characteristics of the ring, snaps into position in engagement with the angled wall 24 of the recess and thus fastens the revenue stamp or seal B in position.

Figure 4 is an elevational view of a tap bush constructed as just described with a revenue stamp or seal B in sealing relationship.

Figure 6 illustrates a tap bush constructed somewhat similarly to Figure 5 except that the upwardly extending wall 26 of the undercut recess 27, instead of being arranged as an acute angle to the horizontal portion of the recess, and in a straight line, is arcuate in section. The sealing ring F is adapted for application to the recess 27 to seal the stamp or seal B in position, has an upstanding flange 28 of such flexibility as to snap into position in conformity with the curvature of the wall 26 of the recess.

In the form of bush illustrated in Figure 8, the upper margin thereof is provided with a cutout 29 which terminates at its lower margin with an undercut 30. The seal or revenue stamp B is applied to this bush with its extremities lying in the undercut 30. A sealing ring, such as is illustrated in Figure 7, is then applied over the margins of the revenue stamp B and with the extremities of the ring inserted in the undercut 30 to thus secure the stamp or seal B over the bush.

The ring G has a flat marginal portion 31, and an upwardly inclined portion 32. The upwardly inclined portion 32 defines an opening 33 which is greater than the diameter of the outer periphery of the flange 34 of the bush. The ring G is somewhat flexed when it is forced home into the undercut portion 30 of the bush to secure the revenue stamp or seal in position.

The construction illustrated in Figure 9 is quite similar to that illustrated in Figure 8 except that a split spring ring 31' is employed to enter the undercut portion 32 to secure the seal or stamp B in position.

It will be observed that in all of the constructions heretofore explained, the seal or revenue stamp B overlies the central opening in the bush, through which opening the cork is applied, from outside the barrel, to close the opening in the tap bush and through which the pump rod is inserted when a tap is applied to the barrel for discharging the barrel contents.

When it is desired to tap a barrel sealed in the manner herein described, the tap is applied against the stamp or seal, thus breaking it, or, if desired, the stamp may be cut out inside the periphery of the several sealing rings which retain the same in position, or else may be cut out to coincide with the rod opening. In any event the sealing ring remains in place on the bush as this is so positioned as not to interfere with the application of a tap and the association of the tap with the bush in gas tight relation. When a barrel has been emptied of the contents, it is returned to the brewery for refilling.

Should any barrel so returned have the sealing ring removed, then heed is made of this fact and an investigation made to determine under what circumstances such sealing ring was removed.

It is contemplated that the sealing rings remain on the bushes when the barrels are returned to the breweries, thus indicating that the seals or stamps have been mutilated in removing the same from the bushes.

Absence of any sealing ring from a tap bush out of an empty barrel returned to a brewery would indicate that the sealing ring had been pried off in some manner and the stamp removed unmutilated, and undoubtedly utilized for bootleg liquor. Such circumstances would thereupon be investigated by proper authorities, and proper action taken to punish such unauthorized removal of the stamp and to prevent its reoccurrence.

The seal is preferably of frangible material so as to readily break when a tap is applied to a bush sealed in accordance with the present invention.

The invention has been described herein more or less precisely as to details but it is to be understood as not to be limited thereby, as changes may be made in the arrangement and proportion of parts and equivalents may be substituted without departing from the spirit and scope of the invention.

The invention is claimed as follows:

Sealing means for a tap bush including in combination with a tap bush having an undercut groove in it inwardly of its outer end, a seal inserted in said groove, and an unsplit ring of angular cross-section pressed into said groove to retain said seal in place.

FRANK E. RICE.